United States Patent [19]

Bakke et al.

[11] Patent Number: 5,481,877
[45] Date of Patent: Jan. 9, 1996

[54] DOUBLE ACTING PULSATOR WITH VALVED PISTON

[75] Inventors: Asbjørn Bakke; Kåre Wessel-Hanssen, both of Kongsberg, Norway

[73] Assignee: Kongsberg Automotive A/S, Kongsberg, Norway

[21] Appl. No.: 50,283

[22] PCT Filed: Nov. 14, 1991

[86] PCT No.: PCT/NO91/00142

§ 371 Date: May 13, 1993

§ 102(e) Date: May 13, 1993

[87] PCT Pub. No.: WO92/08914

PCT Pub. Date: May 29, 1992

[30] Foreign Application Priority Data

Nov. 15, 1990 [NO] Norway .................................. 90 4957

[51] Int. Cl.⁶ .............................. F15B 7/00; B60T 11/26; B60K 20/00
[52] U.S. Cl. ................. 60/571; 60/588; 60/594; 74/473 R; 91/422; 91/462
[58] Field of Search .............................. 60/571, 572, 573, 60/585, 586, 587, 588, 589, 591, 594; 91/422, 462; 74/473 R

[56] References Cited

U.S. PATENT DOCUMENTS

| | | |
|---|---|---|
| 1,495,274 | 5/1924 | Teetor . |
| 2,032,844 | 3/1936 | Hannafy . |
| 2,079,684 | 5/1937 | Church . |
| 2,146,030 | 2/1939 | Schjolin ............................ 74/473 R X |
| 2,178,061 | 10/1939 | Bachman . |
| 2,181,754 | 11/1939 | White ...................................... 60/588 X |
| 2,190,228 | 2/1940 | Bowen ................................... 60/589 X |
| 2,192,012 | 2/1940 | La Brie ...................................... 60/588 |
| 2,242,542 | 5/1941 | Peterson ................................. 60/570 X |
| 2,243,385 | 5/1941 | Levy ............................................... 60/573 |
| 2,359,949 | 10/1944 | Van Der Werff ..................... 91/422 X |
| 2,527,727 | 10/1950 | Hobbs . |
| 3,991,845 | 11/1976 | LaPointe ........................... 84/473 R X |
| 4,030,560 | 6/1977 | Parquet et al. ....................... 60/588 X |
| 4,633,726 | 1/1987 | Chang .................................. 74/473 R |

FOREIGN PATENT DOCUMENTS

| | | |
|---|---|---|
| 53279 | 6/1937 | Denmark . |
| 1152838 | 2/1958 | France ..................................... 60/588 |
| 522119 | 6/1940 | United Kingdom ..................... 60/587 |

*Primary Examiner*—John E. Ryznic
*Attorney, Agent, or Firm*—Finnegan, Henderson, Farabow, Garrett & Dunner

[57] ABSTRACT

A gear shift device for gear boxes for vehicles, comprising at least one pair of mutually connected, double-acting hydraulic cylinders (1,2), where the pair consists of a master cylinder (1) and a slave cylinder (21). The master cylinder can be operated via a gear lever and the slave cylinder moves a mechanism which is connected to gear selector carriers in the gearbox. According to the invention each end section of the master cylinder's (1) piston (4) has an outer (54 or 55) and an inner (56 or 57) piston sealing ring which are arranged at intervals, calculated in the piston's longitudinal direction, and in these end sections there is provided a drilling (52 or 53) whose first end leads into the piston surface between the respective end sections outer and inner sealing rings (54, 56 and 55, 57 respectively), and whose second ends leads into the adjacent end face of the piston (4). Further, in each channel (52, 53) is provided a non-return valve (50, 51) which permits fluid to flow only from the first end of the channel (52, 53) to its other end, and in the master cylinder's (1) cylinder part (2) are provided two drillings 12, 13) whose one end, when the piston is situated in a central or neutral position in the cylinder (2) leads into the cylinder wall at a point between the outer (54 or 55) and the inner (56 or 57) sealing rings, and whose other end communicates with a fluid reservoir.

1 Claim, 1 Drawing Sheet

DOUBLE ACTING PULSATOR WITH VALVED PISTON

BACKGROUND OF THE INVENTION

A gear shift device for gear boxes for vehicles, comprising at least one pair of double-acting hydraulic cylinders, the pair consisting of a double-acting hydraulic master cylinder, whose piston can be moved by means of a gear lever, and a double-acting hydraulic slave cylinder with a piston, which via a mechanism is connected to gear selector carriers in the gear box, where the cylinder spaces in each end section of the master cylinder are connected with the respective cylinder spaces of the slave cylinder via conduits, there being provided in each end section of the master cylinder's piston a drilling, whose first end leads into the piston wall and whose second end leads into the adjacent end face of the piston, and there being provided in each end section of the master cylinder's cylinder part a drilling, whose first end leads into the cylinder wall and whose second end communicates with a fluid reservoir, in addition to which there are provided in the master cylinder non-return valves which permit fluid to flow from the reservoir to the respective master cylinder spaces.

From DK 53279 there is a known system of the above-mentioned type with return of the driven part of the system to a central or neutral position which corresponds to a neutral position of the driving part of the system, i.e. that part which is directly operated by the gear lever, where an attempt is made to find a solution in that a driving cylinder pair comprise return springs which are combined with force controlled, spring-loaded non-return valves.

The function of this system is affected by the friction which is exercised between the components, this being a disadvantage since it causes hysteresis. Furthermore, the valve device comprises many components and is complicated, which makes it more expensive.

Further, from U.S. Pat. No. 2,178,061 there is a known system in which return of the system's components to a neutral position is achieved by means of back-pressure springs on both cylinders, and from U.S. Pat. No. 2,242,542 there is a known system comprising a valve which is forcibly opened in order to achieve communication between the cylinder spaces and the tank only when the components of the device are in a neutral position.

The object of the invention is to provide a system which is not encumbered with the above-mentioned disadvantages.

SUMMARY OF THE INVENTION

In accordance with the invention, a gear shift device for gear boxes for vehicles is provided comprising at least one pair of double-acting hydraulic cylinders, the pair consisting of a double-acting hydraulic master cylinder having a piston that can be moved by means of a gear lever in a cylinder part and a double-acting hydraulic slave cylinder having a piston which via a mechanism is connected to gear selector carriers in a gear box, wherein cylinder spaces in each end section of the master cylinder are connected with respective cylinder spaces of the slave cylinder via conduits, there being provided in each end section of the master cylinder's piston a channel having a first end that leads to and ends in a wall of the piston and a second end that leads to and ends in an adjacent end face of the piston, and there being provided in each end section of the master cylinder's cylinder part, a channel having a first end that leads to and ends in the cylinder's wall and a second end that communicates with a fluid reservoir, and non-return valves in the master cylinder which permit fluid to flow from the reservoir to the respective master cylinder spaces, each end section of the master cylinder's piston having an outer and an inner piston sealing ring which are provided at intervals, calculated in the piston's longitudinal direction, the first ends of the channels in the master cylinder's piston that end in the piston's wall, being between the respective end sections' outer and inner sealing rings, and the first ends of the channels in the master cylinder's cylinder part that end in the cylinder's wall being at a point between the outer and the inner sealing rings when the piston is situated in a central or neutral position in the cylinder. The master cylinder piston is adapted to be moved further than the distance which corresponds to the distance from its neutral position to the position it has when the slave cylinder piston is in a position in which a gear is engaged, and the outer piston sealing ring in the master cylinder space whose volume is increased during such a further movement, is moved past the corresponding end of the channel in the master cylinder's cylinder part to provide communication between the reservoir and the adjacent cylinder space of the slave cylinder.

BRIEF DESCRIPTION OF THE DRAWINGS

In the following section the system will be described in more detail with reference to the drawings which illustrate an embodiment of a gear shift device according to the invention.

DETAILED DESCRIPTION OF THE INVENTION

Figure 1:
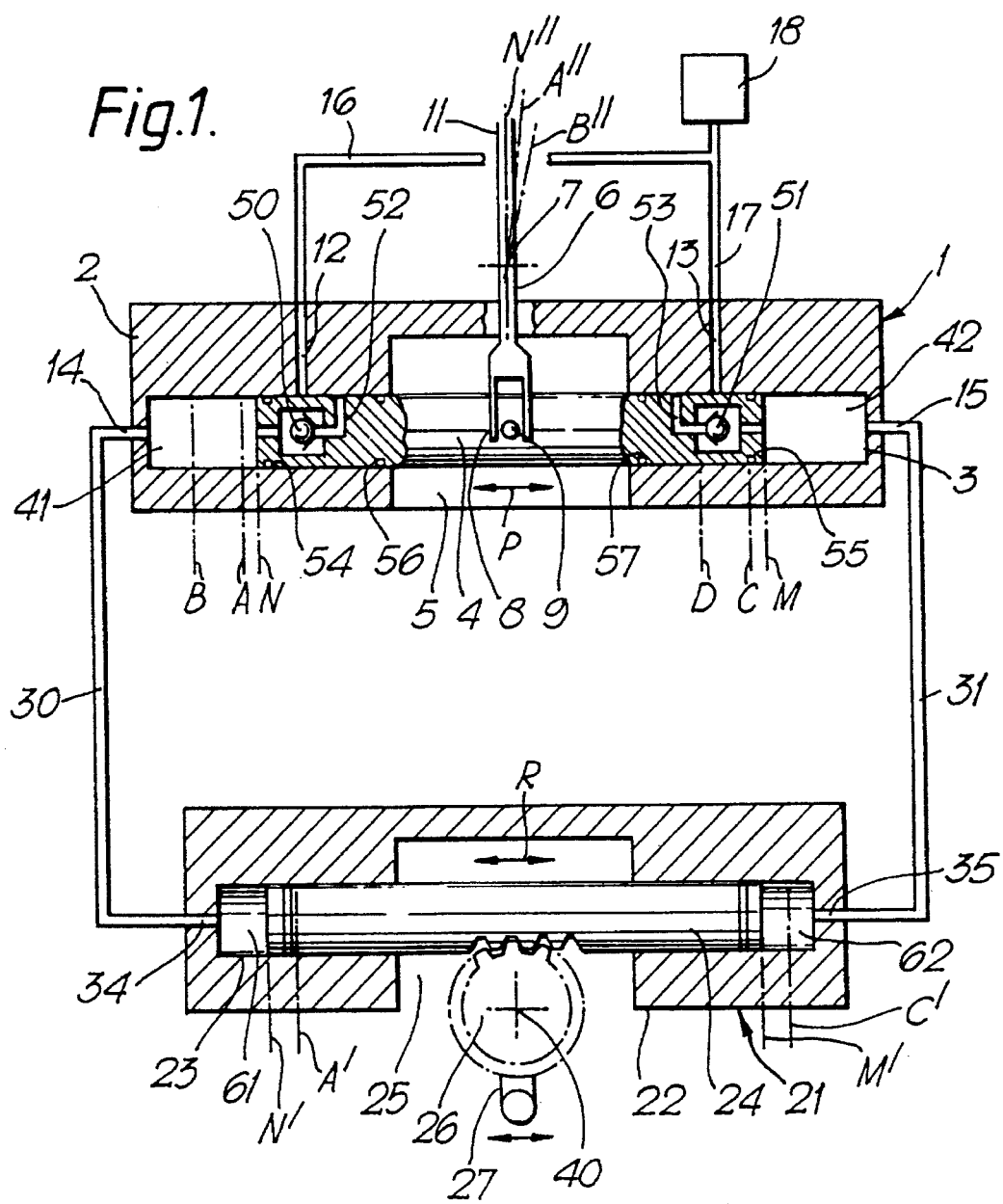
FIG. 1 shows a schematic vertical longitudinal section through a double-acting hydraulic master cylinder and a double-acting hydraulic slave cylinder.

As illustrated in FIG. 1, the gear shift system comprises a hydraulic master cylinder 1 which may be mounted, e.g., under the floor of the driver's cabin of a vehicle (not shown), and a related, double-acting hydraulic slave cylinder 21, which is mounted, e.g., on the vehicle's gear box (not shown).

The master cylinder comprises a cylinder 2 and a piston 4 provided in a drilling 3 in this. A gear lever 6 which can be pivoted about an axis 7 has a first, lower forked end section 8 in gear with a pin 9 of a piston section which extends through a recessed part 5 of the cylinder 2. By operating a second, upper end section 11 of the gear lever, the gear lever can be pivoted about the axis 7 and the piston 4 is moved in the cylinder 2 in the direction of the double arrow P.

From the left and right cylinder spaces 41 and 42 respectively which are situated at the respective ends of the cylinder 2, and which are defined by the piston 4, run channels 12 and 13 which extend in the cylinder's 4 transverse direction, and which via pipes 16 and 17, respectively are connected with a tank 18 which contains the hydraulic fluid which is used in the system. The diameter of these channels can be extremely small, e.g. 0.6 mm.

. In each end section of the piston 4 is provided an L-shaped channel 52, 53, one leg of which runs in the piston's longitudinal direction and leads into the respective piston spaces 41, 42 and whose other leg runs in the piston's transverse direction and ends between the respective axial outer and inner piston sealing rings 54, 55 and 56, 57 respectively, the outer sealing rings being provided close to the respective piston ends and the inner provided between the outer piston rings, i.e. axially inside these. Channels 52, 53 communicate with cylinder channels 12, 13 when these are opposite the respective piston sections which are defined by the outer and inner piston rings 54, 56 and 55, 57 respectively. In each piston channel 52, 53 is provided a non-return valve 50 and 51 respectively which permits the flow of fluid from the tank to the cylinder spaces 41, 42 via the cylinder channels 12, 13, but not in the opposite direction.

The distance between the openings of the channels 12, 13 which are facing the drilling 3 is smaller than the distance between the outer sealing rings 54 and 55, but greater than the distance between the inner sealing rings. When the gear lever 6 and the piston 4 are in a central or neutral position, the openings of the channels 12, 13 will thus be situated between the corresponding outer and inner sealing rings 54, 56 and 55, 57 respectively. Hydraulic fluid from the tank can then fill the clearance between the cylinder and the piston between these sealing rings.

On the vehicle's gear box is mounted a double-acting hydraulic slave cylinder 21, whose piston 24 can be moved in the direction of double arrow R in a drilling 23 in the slave cylinder's body 22. A central section of the piston 24 extends through a recessed section 25 of the cylinder 22 and is in the form of a toothed bar which is in gear with a gear wheel 26, which is rotatably mounted so that it can rotate about an axis 40. The gear wheel 26 is fixedly connected to a radially extending arm 27 which is in gear with a gear selector carrier (not shown) in the gear box, the movement of the arm 27 being capable of causing a gear change through the movement of, e.g., known per se shifting forks.

From each end of the drilling 3 of the master cylinder runs a channel 14 or 15 which via respective pipes and flexible hoses 30 and 31 is connected with corresponding channels 34 and 35 respectively which are connected to the respective cylinder spaces 61 and 62 in the slave cylinder 21.

The mode of operation of the above-described hydraulic gear shift system is as follows:

In the neutral position the gear lever 6 is in the position indicated by N". In this position of the gear lever the ends of the piston 4 are situated in the positions indicated by N and M respectively, and the ends of the piston 24 are situated in the positions indicated by N' and M' respectively.

If a gear shift is required, the gear lever is moved to the position indicated by A". The piston 4 of the master cylinder 1 will be moved to the left of the figure, and because the non-return valve 50 is closed, the fluid which is in the left-hand master cylinder space 41, will be forced against the slave cylinder's cylinder space 61 via the channels 14, 34 and the pipe/hoses 30, which in turn causes the piston 24 of the slave cylinder 21 to be moved to the right of the figure and the gear wheel 26 to be turned.

At the same time fluid from the slave cylinder's cylinder space 62 is forced into the master cylinder's cylinder space 3 via the channels 35 and 15 and the pipes/hoses 31. This movement continues until the slave cylinder piston 24 is stopped by the gear shift mechanism because the gear shift is completed.

The ends of the piston 4 will now be situated at A and C respectively, whereby the outer right-hand sealing ring 55 has not moved further to the left than that it is still forming a seal between the master cylinder space 42 and the channel 13, while the ends of the piston 24 will be situated at A' and C' respectively. By means of, e.g., a spring-loaded locking device, the required gear from the gear box will be maintained until the gear lever is moved in the opposite direction.

Thus, when the gear is engaged, the channel 13 will normally still be situated between the piston rings, and the slave cylinder's piston 24 will be moved due to the hydraulically rigid connection or "locking" between the pistons 4 and 24, the non-return valve 50 being closed.

If the slave cylinder's piston 24 or the master cylinder's piston 4 should be situated initially on the left of the neutral or central position illustrated in FIG. 1 when the master cylinder's piston 4 or the slave cylinder's piston 24 respectively are situated in their neutral position, e.g. during a first setting or coordination of the pistons, the master cylinder's piston 4 may have to be moved further, e.g. until the piston ends are situated at B or D, by moving the gear lever to B" or even further before the slave cylinder piston 24 is stopped and a gear shift has taken place. The master cylinder piston's 4 left channel 52 will then still communicate with the master cylinder's left channel 12, but the outer right-hand sealing ring 55 will be situated on the left of the channel opening 13, thus creating communication between the above-mentioned tank and the right-hand cylinder space 42 of the master cylinder 1 and enabling fluid to flow from the tank to this cylinder space or vice versa in the event of, e.g., volume changes as a result of a temperature change, leakage in this part of the system or during the initial setting up of the system as mentioned above.

The final position for the ends of the slave cylinder's piston 24 can be A' and C' as before, this being the position it assumes when the gear shift is completed.

Should the neutral gear position be required, the gear lever is moved initially from B" to A", whereby the ends of the piston 4 are moved from B to A and from D to C respectively. Fluid will now be transported out of the channel 13 to the tank (not shown) from the right-hand cylinder space 42, at the same time as a slight under-pressure is created in the fluid in the left-hand cylinder space 41, thus causing the fluid to be sucked to this from the tank via the non-return valve 50. The transport of fluid via the channel 13 ceases when the right sealing ring 55 of the piston 4 covers this channel, whereby a hydraulic locking occurs between the master cylinder's piston and the slave cylinder's piston. When it can be arranged in such a way that the outer right sealing ring 55 only just seals the opening of the channel 13 when the right end of the master cylinder piston 4 is situated at C, the slave cylinder piston will remain at rest during this entire last-mentioned movement of the master cylinder piston. If the gear lever is then moved from A" to N", the piston 4 will then move further to the right and its ends will be shifted from A to N and from C to M respectively. During this movement the piston 24 will be moved so far to the left that the neutral position is again achieved.

With this movement of the gear lever, both pistons are thereby conveyed to their respective neutral positions, even though the master cylinder piston 4 or the slave cylinder piston 24 were not initially in this position.

A similar sequence occurs when the gear lever is moved in the opposite direction.

If the gear lever is moved to its position B", a leakage in the right-hand hydraulic circuit, i.e. e.g. in the pipe 31, will thereby be compensated for by a flow of fluid from the right-hand tank, since there is a direct connection between the master cylinder's right-hand cylinder space 3 and the tank.

In the case of a leakage in the left-hand hydraulic circuit, i.e. e.g. in the pipe 30, this leakage will be compensated for by a flow of fluid from the tank to this circuit via the non-return valve 50. The slave cylinder piston will therefore be automatically conveyed to its neutral position every time the master cylinder piston 4 is moved to its neutral position. This will also occur during the initial setting up of the system.

Further, the same neutral position will also be obtained if the gear lever is only moved to position A" and a slight fluid leakage has occurred in the system, because the cylinder spaces will then be filled with hydraulic fluid from the tank via the non-return valves.

If a gear shift device is required for a gear box with more than two gears, e.g. six gears, a second master and slave cylinder pair can be provided which are of the same type, but with the longitudinal axes of the respective master cylinders and slave cylinders at right angles to each other.

In this case the longitudinal axes of the master cylinders can run in the same plane, their mid-section, e.g., being recessed or this section being divided and the cylinder parts connected by means of a frame or similar device, or one master cylinder being arranged below the other.

Further, instead of a gear wheel 26, a gear or groove axle can be provided which is common to both slave cylinders, and where axial movement of this causes the arm 27 to be in gear with gear change sliding rails for the gear couples 3 and 4 and 5 and 6 respectively, where these gear change sliding rails run parallel with the gear change sliding rail for the first and second gears, in that one slave cylinder piston causes movement of the mechanism for shifting of gears belonging to the same gear pair, and the other slave cylinder piston causes movement of the mechanism for connecting this with the respective gear pairs.

The lower end section of the gear lever is designed in a known per se manner and connected with the master cylinders, movement of the gear lever perpendicular to the drawing plane causing shifting of the piston of the second master cylinder at the same time as movement of the gear lever in the drawing plane causes movement of the master cylinder 1 as described earlier.

Figure 2:
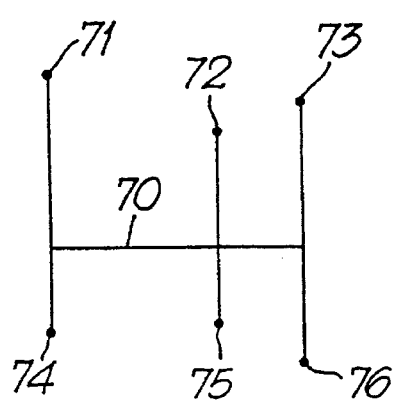
FIG. 2 is a schematic view of the path of that section of a gear wheel or gear axle arm which is arranged to be in gear with the gear selector carriers of a gear box.

FIG. 2 illustrates an example of a path which is covered by the end section of the arm 27 of the gear axle when gearing with a device with six gears. By moving the gear lever handle in a corresponding pattern, gear shifting will be achieved for a gear box with six gears. Positions along the horizontal line 70 represent the above-mentioned end section's 27 positions between the gear pairs' sliding rails when the gear lever handle is moved perpendicular to the drawing plane, and the end points 71, 72, 73, 74, 75 and 76 represent end positions of the end section 27 when this is moved in the respective gear pair's sliding rails by moving the gear lever handle in the drawing plane, in that the distance from the line of movement 70 as shown can be of different lengths for the different gears.

I claim:

1. A gear shift device for gear boxes for vehicles comprising at least one pair of double-acting hydraulic cylinders, the pair consisting of a double-acting hydraulic master cylinder having a piston that can be moved by means of a gear lever in a cylinder part and a double-acting hydraulic slave cylinder having a piston which via a mechanism is connected to gear selector carriers in a gear box, wherein cylinder spaces in each end section of the master cylinder's cylinder part are connected with respective cylinder spaces of the slave cylinder via conduits, there being provided in each end section of the master cylinder's piston a channel having a first end that leads to and ends in a wall of the piston and a second end that leads to and ends in an adjacent end face of the piston, and there being provided in each end section of the master cylinder's cylinder part, a channel having a first end that leads to and ends in the cylinder part's wall and a second end that communicates with a fluid reservoir, and non-return valves in the master cylinder which permit fluid to flow from the reservoir to the respective master cylinder spaces, each end section of the master cylinder's piston having an outer and an inner piston sealing ring which are provided at intervals, calculated in the piston's longitudinal direction, the first ends of the channels in the master cylinder's piston that end in the piston's wall, being between the respective end sections' outer and inner sealing rings, and the first ends of the channels in the master cylinder's cylinder part that end in the cylinder's wall being at a point between the outer and the inner sealing rings when the piston is situated in a central or neutral position in the cylinder, the master cylinder piston being adapted to be moved further than the distance which corresponds to the distance from its neutral position to the position it has when the slave cylinder piston is in a position in which a gear is engaged, and the outer piston sealing ring in the master cylinder space whose volume is increased during such a further movement, being moved past the corresponding end of the channel in the master cylinder's cylinder part to provide communication between the reservoir and the adjacent cylinder space of the slave cylinder.

* * * * *